United States Patent [19]

Waters et al.

[11] Patent Number: 5,120,148
[45] Date of Patent: Jun. 9, 1992

[54] APPLICATOR ASSEMBLY

[75] Inventors: William E. Waters, Malvern; Arlington R. Harman, Jr., Frazer; Joseph M. Voytilla, Pottstown, all of Pa.; Peter Friedrich, Jersey City, N.J.; Ralph G. Walters, Perkiomenville, Pa.

[73] Assignee: The West Company, Incorporated, Phoenixville, Pa.

[21] Appl. No.: 780,544

[22] Filed: Oct. 22, 1991

Related U.S. Application Data

[63] Continuation of Ser. No. 246,457, Sep. 19, 1988, abandoned, which is a continuation-in-part of Ser. No. 837,535, Mar. 10, 1986, abandoned.

[51] Int. Cl.$^5$ .............................................. A45D 34/0
[52] U.S. Cl. .................................... 401/264; 222/207; 222/211; 222/448; 401/186; 401/206; 401/266
[58] Field of Search ............... 401/261, 148, 186, 206, 401/264, 266; 222/207, 211, 448, 449, 453

[56] References Cited

U.S. PATENT DOCUMENTS

| | | | |
|---|---|---|---|
| 2,083,156 | 6/1937 | McCabe | 401/148 X |
| 2,210,206 | 8/1940 | Fisher | 401/206 |
| 2,575,180 | 11/1951 | Lurz | 401/264 |
| 2,716,250 | 8/1955 | Deakers | 401/186 |
| 2,949,621 | 8/1960 | Clement et al. | 401/148 |
| 3,091,374 | 5/1963 | Schwartzman | 222/448 |
| 3,108,314 | 10/1963 | House | 401/206 X |
| 3,135,988 | 6/1964 | Schwartzman | 401/206 |
| 3,169,267 | 2/1965 | Luedtke | 401/206 |
| 3,190,505 | 6/1965 | Arbitman et al. | 222/207 |
| 3,220,044 | 11/1965 | Smalley | 401/148 |
| 3,256,551 | 6/1966 | Schwartzman | 401/264 X |
| 3,294,288 | 12/1966 | Macare | 222/207 X |
| 3,298,055 | 1/1967 | Schwartzman | 401/206 |
| 3,347,420 | 10/1967 | Donoghue | |
| 3,390,940 | 7/1968 | Schwartzman | 401/186 |
| 3,545,874 | 12/1970 | Schwartzman | 401/264 X |
| 3,581,953 | 6/1971 | Donoghue | |
| 3,628,700 | 7/1971 | Dodoghue | 222/211 X |
| 3,653,779 | 4/1972 | Schwartzman | 401/206 |
| 4,077,547 | 3/1978 | Donoghue | 222/207 |
| 4,106,673 | 8/1978 | Donoghue | 222/211 X |
| 4,133,614 | 1/1979 | Baginski et al. | |
| 4,376,495 | 3/1983 | Spatz | 222/207 X |
| 4,778,087 | 10/1988 | Desai | 222/449 |

FOREIGN PATENT DOCUMENTS

| | | | |
|---|---|---|---|
| 998021 | 10/1976 | Canada | 222/211 |
| 990439 | 9/1951 | France | 222/211 |
| 1329884 | 5/1963 | France | 401/198 |
| 567988 | 10/1957 | Italy | 222/211 |
| 591955 | 4/1959 | Italy | 222/211 |
| 406544 | 8/1966 | Switzerland | 401/148 |
| 1367936 | 9/1974 | United Kingdom | 401/206 |

*Primary Examiner*—Steven A. Bratlie
*Attorney, Agent, or Firm*—Eugene E. Renz, Jr.

[57] ABSTRACT

Applicator assembly comprising a container for liquids having a bottom wall member, a cap member having means for detachably securing it over a discharge opening in the container. An upstanding wall and a bottom wall having an upstanding post member having an opening communicating with the interior of the container define a measuring chamber for a predetermined measured quantity of the liquid with a cylindrical wall portion of the cap member. An elongated tubular member is mounted in the opening in the post member extending downwardly into the container adjacent the lowest portion of the bottom wall member. A valve seat plate member is mounted at the open end of the cylindrical wall portion and has a wall portion terminating in a valve opening which is tapered towards the valve opening and functions as a funnel during discharge of contents to ensure complete transfer from the measuring chamber to a dispensing chamber above the measuring chamber. A flexible dauber having outlet holes is mounted over the outer end of the valve seat plate member and having a depending valve element biased solely by the dauber to normally seal the valve opening therein. The valve member is actuatable inwardly by pressure to overcome the bias of the dauber to permit flow of fluid from the measuring chamber to an enclosed dispensing chamber defined by dauber and valve seat plate member.

2 Claims, 3 Drawing Sheets

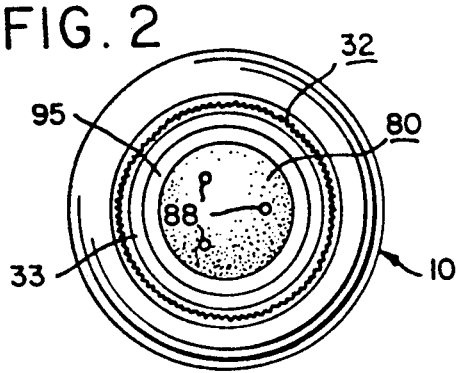
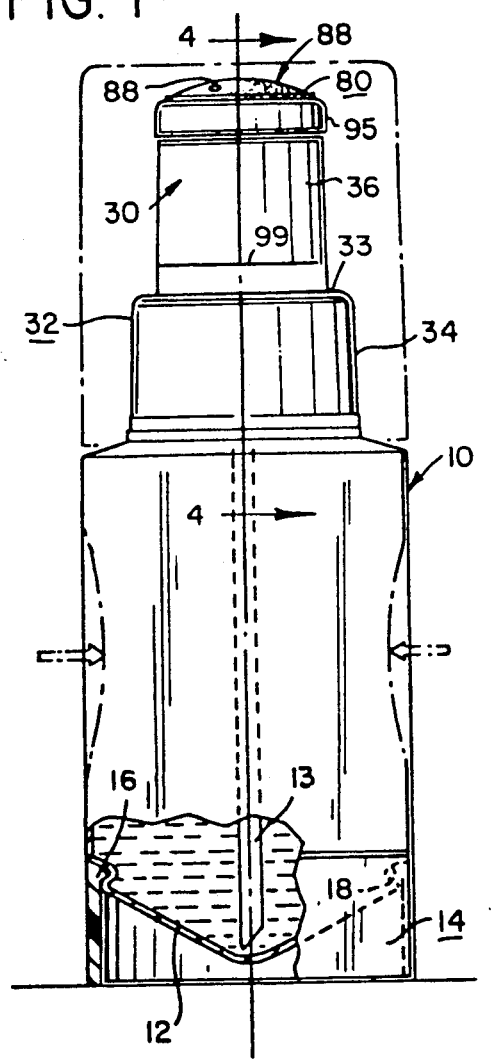
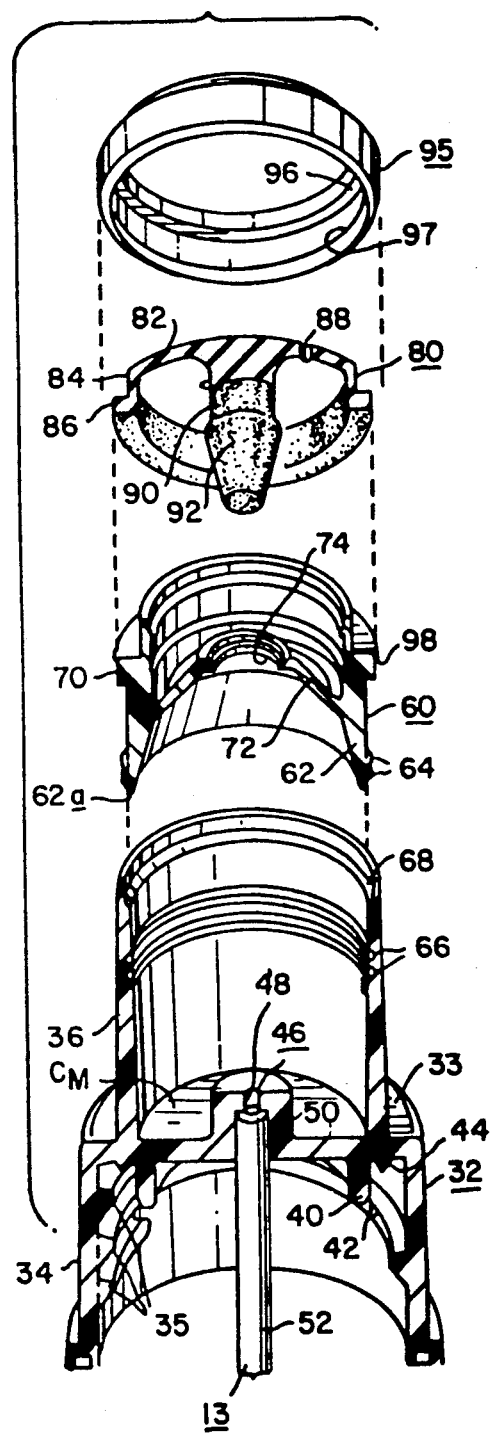

APPLICATOR ASSEMBLY

This is a continuation of copending application Ser. No. 246,457, filed on Sep. 19, 1988, now abandoned, which is a continuation-in-part of application Ser. No. 837,535, filed on Mar. 10, 1986, now abandoned.

BACKGROUND OF THE INVENTION a. Field of the Invention

The present invention relates to packages for measuring and dispensing liquid products and specifically to a package assembly for dispensing predetermined measured quantities of liquids.

b. Description of the Prior Art

Measuring and dispensing package assemblies are not new per se. For example, the Robert J. Donohue U.S. Pat. No. 4,077,547 entitled MEASURING AND DISPENSING APPARATUS issued Mar. 7, 1978 shows a package assembly comprising a flexible wall container having a threaded finish, a measuring and dispensing section mounted above the container and tube means extending from the measuring and dispensing section into the container. The dispensing section has an upstanding tubular member having a bore in fluid communication with an outlet orifice disposed at the upper terminal end thereof. The tube means extends into the bore of the upstanding dispensing member. In this fashion when it is desired to dispense a measured quantity of a liquid from the container, the user simiply squeezes the walls of the container whereby liquid is displaced through the tube into the bore of the upstanding portion out the outlet orifice and into the measuring chamber. If the volume of liquid dispensed from the container into the measuring chamber is in excess of a predetermined volume as determined by the upper face of the upstanding tubular member, excess liquid will be withdrawn back into the container when the squeezing pressure is released.

Similar measuring and dispensing assemblies are shown in U.S. Pat. Nos. 3,347,420 and 3,581,953.

Of interest also is U.S. Pat. No. 4,133,614 issued Jan. 9, 1979 to John R. Baginsky for DAUBER AND METHOD OF ASSEMBLY. This patent shows a dauber fitment comprising a plurality of elements including a valve member, a resilient porous element, a flexible porous applicator pad and retaining ring for retaining the part in the assembled condition.

SUMMARY OF THE INVENTION

Even though the above described prior art assemblies are generally suitable for the purposes intended, the present invention provides a more simplified assembly which is economical to manufacture and assemble and has certain functional advantages over the prior assemblies discussed above. To this end, the dispensing and measuring assembly of the present invention comprises a unitary cap and dispensing chamber section having means for applying it over the discharge opening of a flexible container for a liquid to be dispensed. The section includes an upstanding discharge port in the measuring section for mounting a tube extending downwardly into the container. A dauber assembly is mounted at the outer end of the measuring chamber having valve means normally sealing the discharge end of the dispensing chamber and operable upon applying pressure to the flexible dauber head to be actuated to an open position permitting flow of fluid from the measuring chamber to the dauber head.

With the foregoing in mind, an object of the present invention is to provide a package for measuring and dispensing liquid products which is of relatively simplified design that is easy and economical to manufacture and assemble.

Still another object of the present invention is to provide an applicator assembly which can be easily and quickly applied to conventional squeeze-type containers and which is characterized by novel features of construction and arrangement facilitating withdrawal and dispensing of predetermined controlled quantities of the liquid product and which ensures dispensing the same quantity for each successive activation thereof.

Still another object of the present invention is to provide an applicator assembly of the above type which is truly leak-proof by reason of a novel arrangement of seals between the interengaging parts comprising the assembly.

A further object of the present invention is to provide an applicator assembly wherein the user can visually determine the premeasured dosage to thereby ensure accuracy of the premeasured quantity dispensed over repeated uses of the applicator assembly.

Still another object of the present invention is to provide a novel, flexible dauber assembly made of a resilient material such as rubber which ensures dispensing of all the premeasured quantity as compared to daubers incorporating a porous element such as in Baginsky.

A still further object of the present invention is to provide an applicator assembly wherein the dauber includes a control valve element normally sealing the dispensing and measuring chambers from one another and wherein the member separating the measuring and dispensing chambers is of a funnel-shaped configuration to ensure complete discharge of a premeasured quantity of the liquid from the measuring chamber to the dispensing chamber upon actuation of the dauber valve element.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a side elevational view partly in section of a measuring and dispensing package in accordance with the present invention;

FIG 2 is a top plan view thereof;

FIG 3 is an exploded perspective view of the elements comprising the measuring chamber and dispensing dauber;

DESCRIPTION OF THE PREFERRED EMBODIMENTS

Figure 5:
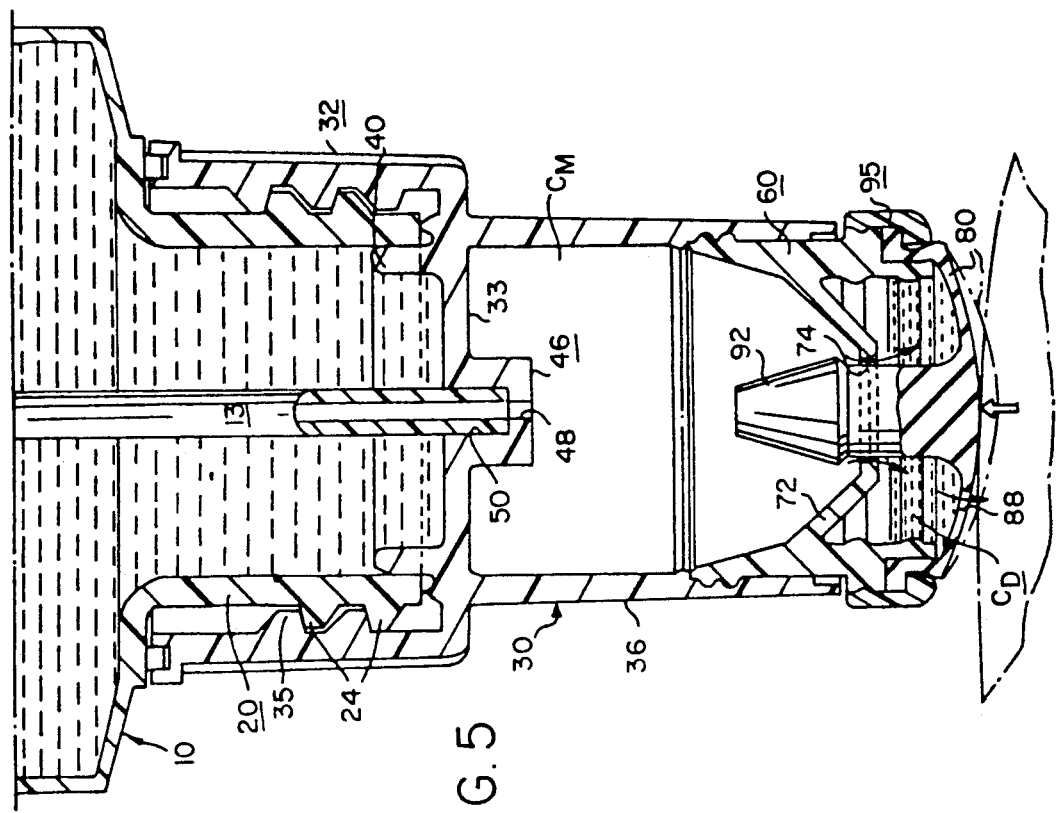
FIG. 5 is an enlarged sectional view similar to FIG. 4 showing the dauber valve in an open position.

Referring now to the drawings and particularly to FIGS. 1-5 thereof, there is illustrated a measuring and dispensing assembly for use on squeeze-type containers for liquid products. The assembly is adapted for dispensing liquids such as medicaments used as topicals for application to the skin of human beings. The package of the present invention is particularly suited for use with medicaments where it is desired and necessary to dispense accurately controlled, measured quantities for periodic application of these precise quantities over an extended period of time. The flexible container 10 is preferably made of a plastic material such as polyethylene and is of generally circular cross section, including, in the present instance, a conical base 12 to facilitate withdrawal of the entire contents of the container by a dip tube 13 in a manner described in more detail below. An adaptor in the form of a collar 14 snap fitted by a rib 16 and groove 18 to the conical base 12 serves as a stand for supporting the package in an upright position. The container 10 as illustrated has an upstanding neck portion 20 defining a discharge opening 22. The neck 20 is provided with conventional external screw threads 24 so that it may be sealed by a conventional internally screw-threaded cap or the like. (not shown)

In accordance with the present invention, the measuring and dispensing assembly is provided which is characterized by novel features of construction and arrangement which provides for accurate dispensing of preselected, premeasured quantities of liquid products. The assembly is also of relatively simplified design so that it is easy and economical to manufacture and assemble to containers of the type described above. The assembly referenced generally by the numeral 30 is characterized by a novel sealing arrangement for sanitary considerations and also for preciseness in the quantities of the liquid product being dispensed. To this end, the assembly includes a combination cap and measuring and dispensing chamber sub-assembly comprising, as best illustrated in FIG. 3, a cap portion 32 of inverted cup-like form having a top 33 and depending skirt 34 with internal screw threads 35 which mate with the external threads 24 on the neck of the container 10 to facilitate mounting of the assembly over the discharge end of the container and an upstanding generally cylindrical wall 36 projecting upwardly from the outer face 33 of the top of the cap. The cap portion 32 also includes a generally cylindrical depending flange 40 having a feathered or beveled lower terminal edge 42 which engages interiorly of the neck 20 of the container and which together with a sealing rib 44 spaced radially outwardly therefrom engages the axial end face of the neck of the container when applied thereto in the manner shown in the drawings to ensure a fluid-tight seal between the measuring and dispensing assembly and the container.

Figure 4:
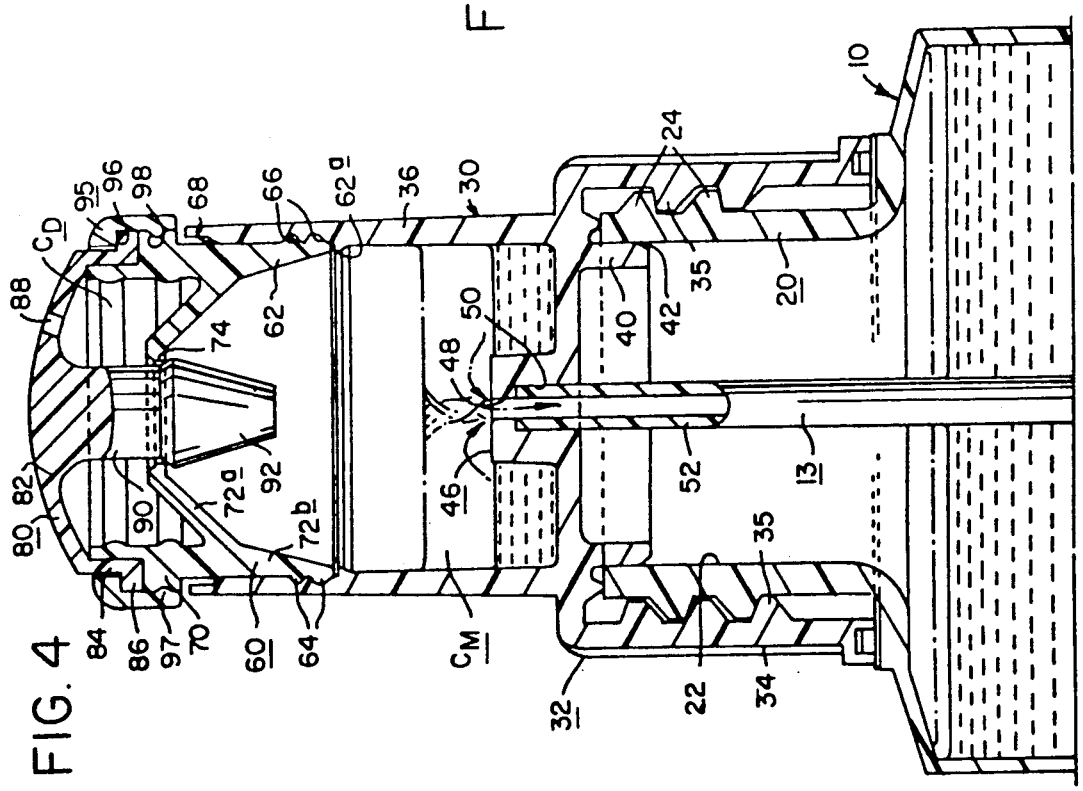
FIG. 4 is an enlarged sectional view taken on line 4—4 of FIG. 1.

As illustrated in FIGS. 3-5 inclusive, the cap section 32 has an upstanding center projection or post 46 disposed centrally of the measuring chamber having an axially oriented discharge port 48 extending therethrough. The discharge port 48, as illustrated, has an enlarged portion 50 for mounting a tube 52 to draw liquid contents from the container into a measuring chamber $C_M$. The height of the post 46 above the level of the top wall 33 of the cap 30 coupled with the internal diameter of the measuring chamber determines the controlled, premeasured volume which can be dispensed. Of course, this volume may be selectively varied in a combination cap and dispensing chamber sub-assembly by simply changing the height of the post 46 and/or the diameter of the measuring chamber $C_M$.

In the present instance, the dispensing assembly further includes a valve seat plate member 60 of generally elongated tubular configuration having a feathered lower skirt portion 62 having, in the present instance, a pair of axially spaced circumferentially extending radially outwardly projecting sealing ribs 64 which are adapted to engage in internal grooves 66 in the inner side wall of the measuring chamber $C_M$. Note that the cylindrical wall 36 defining the measuring chamber $C_M$ is tapered adjacent its upper open terminal edge and is stepped as at 68 to define an enlarged pilot portion for easy insertion and assembly of the valve seat plate 60. The valve seat plate 60 as illustrated has a stepped shoulder 70 adjacent its upper terminal end which overlies the outer side wall of the dispensing chamber in the assembled relation in the manner shown in FIGS. 4 and 5. The valve seat plate 60 as illustrated includes an interior stepped frusto-conical wall 72 including tapered wall sections 72a, 72b having a central opening 74 defining a valve seat. Note the tapered wall sections 72a, 72b ensure complete purging of the measuring chamber.

The valve seat plate 60 mounts a dispensing dauber 80 made of a flexible material such as rubber and comprises a dome section 82 having a depending cylindrical wall portion 84 merging with a radially outwardly directed circumferentially extending lip 86. The dome section 82 has fluid discharge means in the present instance in the form of a series of circumferentially spaced discharge openings 88 arranged in a circular array. The openings 88 are preferably normal to the outwardly convex curvametric surface 82a. This configuration functions as a spring to normally maintain the valve portion 92 seated and also to return it to a seated position after actuation as illustrated in FIG. 5. Centrally of the discharge openings, the dome section has a depending valve stem 90 having an enlarged tapered frusto-conical valve portion 92 which engages through the discharge opening 74 in the valve seat and is normally biased to a sealed or seated position (FIG. 4). The dauber is detachably supported in place by retaining ring 95 having a short radially inwardly directed outer flange 96 which seats against the lip 86 of the dauber and a beveled lower locking flange 97 which engages in a circumferentially extending locking groove 98 in the outer peripheral wall of the valve seat plate to lock the parts in place in the manner shown in FIGS. 4 and 5.

The elements comprising the measuring and dispensing assembly of the present invention may be assembled and applied to a container easily and quickly. For example, the valve seat plate 60 is assembled to the cap section 32 by telescoping the valve seat plate 60 until the sealing ribs 64 snap into and seat in the grooves 66 on the inner sidewall 36 of the measuring chamber $C_M$. In this position the sealing bead 62a at the lower end of the skirt portion 62 seats and seals against a circumferentially extending shelf or shoulder on the interior wall 36 of the measuring chamber $C_M$. The dauber 80 is then assembled to the valve seat plate 60 simply by positioning it over the open end of the valve seat plate and then pressing the dauber 80 and retaining ring 95 in place. The dip tube 13 is then pressed into the enlarged bore of the center post. The assembly may then be applied to a squeeze-type container 10 and the entire unit is now ready to use.

Consider now briefly operation and use of a package incorporating the measuring and dispensing unit in accordance with the present invention. With the package in an upright position as illustrated in FIG. 1, the user simply squeezes the side wall of the flexible container 10 which produces flow of liquid through the tube 13 into the measuring chamber $C_M$ until a measured quantity of the liquid is accumulated therein as shown in FIG. 4. When the squeezing motion is stopped, any excess liquid will flow back through the tube 13 into the container so that the quantity remaining in the measuring chamber $C_M$ is the precise quantity required. Indicia in the form of a line marker 99 may be provided on the wall of the measuring chamber $C_M$ to provide visual means for the user to determine that the precise quantity desired for a given application has been withdrawn from the container. The assembly is then inverted whereby the fluid flows to the top of the measuring chamber which is sealed by the valve 92 of the dauber 80. When the dauber 80 is now pressed against the skin of the user, the valve stem is displaced inwardly to permit flow of the measured quantity of liquid into the dispensing chamber $C_D$ behind the dauber. The dauber is then simply moved over the skin surface until the premeasured quantity has been dispensed through the discharge openings 88.

Figure 7:
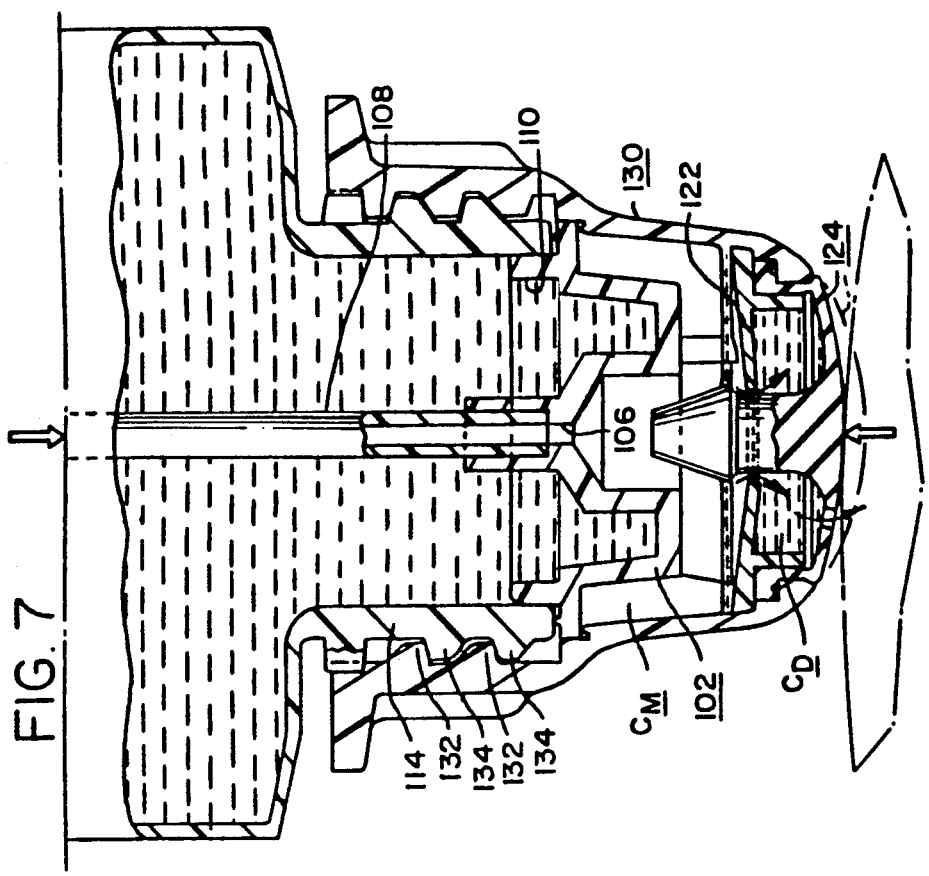
FIG. 7 is an enlarged sectional view similar to FIG. 6 showing the dauber valve in an open dispensing position.
Figure 6:
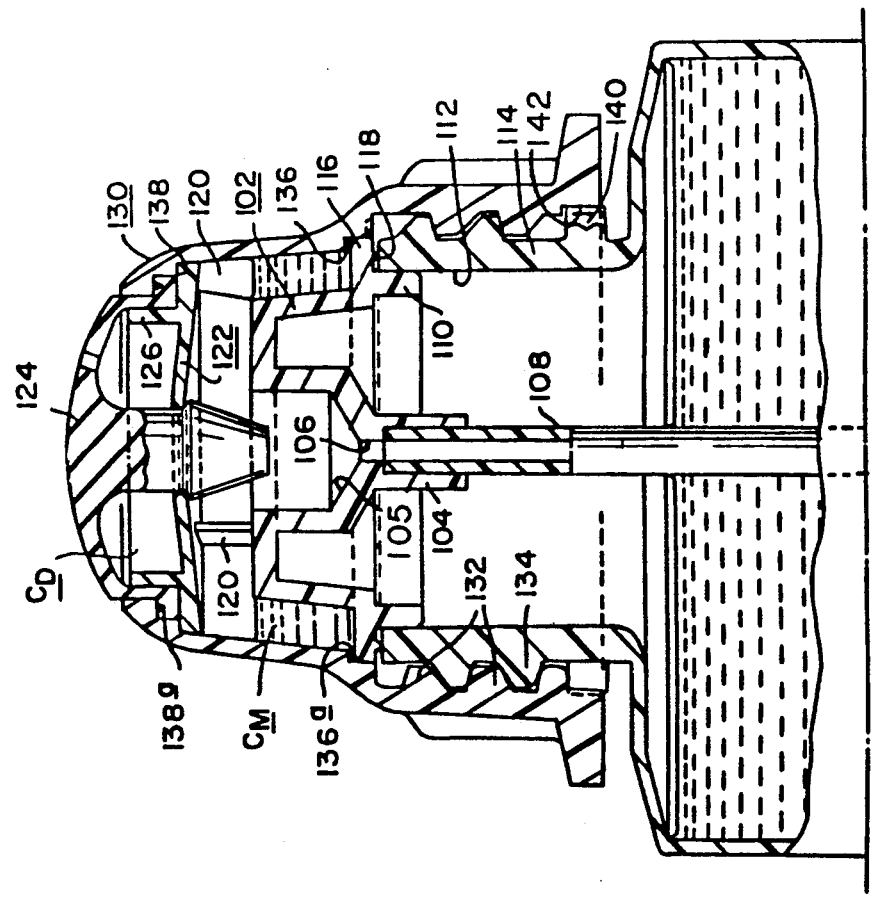
FIG. 6 is a transverse sectional view of a modified form of measuring and dispensing assembly in accordance with the present invention showing the dauber valve in a closed position.

There is illustrated in FIGS. 6 and 7 another embodiment of measuring and dispensing assembly in accordance with the present invention for mounting over the discharge end of a squeeze-type container. The container is identical to that described previously and is of the squeeze type. However, in this instance, the measuring and dispensing sub-assembly is somewhat different in its components and arrangement. In the present instance, the assembly includes a metering plate 102 of generally M-shaped cross section having as illustrated a central depending collar 104 defining a well 105 aligned with and concentric to the dauber valve element which can nest therein upon actuation of the dauber providing a compact arrangement of elements. The collar has tapered base terminating in a central opening 106 defining a fluid discharge port. The opening is enlarged to accommodate a dip tube 108 which extends to the bottom of the container to withdraw the liquid contents therefrom when desired. The metering plate, as illustrated, has a circumferentially extending depending sealing flange 110 which engages interiorly of the discharge opening 112 in the container neck 114 and a radially outwardly directed flange 116 with a sealing bead 118 on its lower surface which confronts and engages the axially end face of the bottle finish. The metering plate 102 further includes a series of three circumferentially spaced upstanding ribs 120 which support a valve seat plate 122. In the present instance the dauber valve 124 overlies a circumferentially upstanding cylindrical wall 126 of the valve seat plate and is firmly seated sealed against the seat plate by an overcap 130 which has internal threads 132 cooperating with external screw threads 134 on the container finish. The retainer cover, as illustrated, has two sealing shoulders 136, 138 with circumferentially extending sealing beads 136a, 138a which engage, secure and seal the metering plate, valve seat plate and dauber valve in the relative position shown when it is fully seated on the neck of the container. The container neck has diametrically opposed radially projecting teeth 140 engageable in axial grooves 142 formed in the lower portion of retainer 130 to permit assembly and then serve to lock the parts. This arrangement provides a child-resistant feature.

In accordance with this embodiment of the invention, the measuring chamber $C_M$ is defined by the annular space surrounding the metering plate.

Considering now use of the dispenser applicator assembly to dispense predetermined measured quantities of the liquid, the user simply exerts an inward pressure on the side wall of the container which causes liquid to flow upwardly through the central port and into the measuring chamber $C_M$. When the chamber has been filled to the level of the top of the metering plate, any excess liquid will flow through the central enlarged accumulator opening which is also of a size to accommodate the dauber valve element with the return of the container to its original upright position. Now the user simply inverts the assembly and presses the dauber against the skin surface to which it is desired to apply the liquid whereupon the valve opens and the premeasured quantity flows into the accumulation or dispensing chamber $C_D$ behind the dauber valve and flows outwardly through the openings therein to the skin of the user.

While particular embodiments of the present invention have been illustrated and described herein, it is not intended to limit the invention and changes and modifications may be made therein within the scope of the following claims.

What is claimed is:

1. Applicator assembly comprising a container for liquids having a bottom wall member, a cap member having means for detachably securing it over a discharge opening in said container, an upstanding wall, a bottom wall having an upstanding post member having an opening communicating with the interior of said container and defining a measuring chamber for a predetermined measured quantity of the liquid, with a cylindrical wall portion of said cap member, an elongated tubular member mounted in said opening in said post member extending downwardly into said container adjacent the lowest portion of said bottom wall member, a valve seat plate member mounted at the open end of said cylindrical wall portion and having a wall portion terminating in a valve opening which is tapered towards said valve opening and functions as a funnel during discharge of contents to ensure complete transfer from the measuring chamber to a dispensing chamber above said measuring chamber, a flexible dauber having outlet holes and mounted over the outer end of said valve seat plate member and having a depending valve element biased solely by said dauber to be normally sealing the valve opening therein, said valve element actuatable axially by pressure to overcome the bias of said dauber to permit flow of fluid from the measuring chamber to an enclosed dispensing chamber defined by said dauber and valve seat plate member.

2. Applicator assembly comprising a container for liquids having a bottom wall, a cap member (130) having means for detachably securing it over a discharge opening in said container, a valve seat plate member (122) mounted at the open end of said cap member, a metering plate of generally M-shaped cross section disposed between the container and valve seat plate member and wherein a measuring chamber is defined between an upstanding outer wall of said valve seat plate member and a wall of a retainer cap holding the valve seat plate member in place over said discharge opening in the container spaced radially outwardly from said upstanding outer wall of said valve seat plate member, said valve seat plate member having a wall portion which is tapered towards a valve opening and functions as a funnel during discharge of contents to ensure complete transfer of fluid from said measuring chamber to a dispensing chamber above said measuring chamber, a flexible dauber (124) having outlet holes mounted over the outer end of said valve seat plate member and having a depending valve element biased solely by said dauber to be normally sealing said opening in said valve seat plate member (122), said valve element actuatable axially by pressure to overcome the bias of said dauber to permit flow of fluid from the measuring chamber to said dispensing chamber defined by the dauber and valve seat plate member.

* * * * *